(12) United States Patent
Grau

(10) Patent No.: US 11,095,082 B2
(45) Date of Patent: Aug. 17, 2021

(54) WEARABLE POWER CORD

(71) Applicant: Julianne Grau, San Antonio, TX (US)

(72) Inventor: Julianne Grau, San Antonio, TX (US)

( * ) Notice: Subject to any disclaimer, the term of this patent is extended or adjusted under 35 U.S.C. 154(b) by 0 days.

(21) Appl. No.: 17/118,496

(22) Filed: Dec. 10, 2020

(65) Prior Publication Data

US 2021/0184411 A1   Jun. 17, 2021

Related U.S. Application Data

(60) Provisional application No. 62/948,030, filed on Dec. 13, 2019.

(51) Int. Cl.
| | |
|---|---|
| *H01R 13/62* | (2006.01) |
| *H01R 35/02* | (2006.01) |
| *H01R 13/72* | (2006.01) |
| *H01R 13/518* | (2006.01) |
| *H01R 13/73* | (2006.01) |

(52) U.S. Cl.
CPC ......... *H01R 35/025* (2013.01); *H01R 13/518* (2013.01); *H01R 13/72* (2013.01); *H01R 13/73* (2013.01); *H01R 35/02* (2013.01)

(58) Field of Classification Search
CPC ... H01R 13/6392; H01R 13/6395; H01R 4/70
USPC .................................. 439/369, 367, 368, 371
See application file for complete search history.

(56) References Cited

U.S. PATENT DOCUMENTS

| | | | | |
|---|---|---|---|---|
| 5,727,574 A | * | 3/1998 | Frye | A45D 2/00 |
| | | | | 132/210 |
| 5,876,234 A | * | 3/1999 | Hester | H01R 13/6392 |
| | | | | 439/369 |
| 6,047,708 A | * | 4/2000 | Panel | A45D 8/34 |
| | | | | 132/200 |
| 6,263,885 B1 | * | 7/2001 | Levy | A44C 5/0053 |
| | | | | 132/273 |
| 7,699,643 B1 | * | 4/2010 | Rodriquez | H01R 13/6392 |
| | | | | 439/369 |
| 8,061,368 B2 | * | 11/2011 | Chudzik | A45D 8/36 |
| | | | | 132/273 |
| 9,769,943 B2 | * | 9/2017 | Chin | A45F 3/02 |
| 2005/0085118 A1 | * | 4/2005 | Robbins | H01R 13/625 |
| | | | | 439/369 |
| 2007/0084480 A1 | * | 4/2007 | Chudzik | A45D 8/36 |
| | | | | 132/273 |

(Continued)

*Primary Examiner* — Phuong Chi Thi Nguyen
(74) *Attorney, Agent, or Firm* — Shah IP Law, PLLC

(57) ABSTRACT

An apparatus for wearing a power cord includes an elongate power cord having a length that extends from a first end having a power connector to a second end having a device connector. The apparatus also includes an elastic component and a housing for holding the power connector and the device connector therein. The apparatus has a wearing configuration and a charging configuration. In the wearing configuration, the device connector and the power connector are disposed in the housing and the apparatus is secured to the user. In the charging configuration, the device connector extends out of the housing and connects to a portable electronic device, and the power connector extends out of the housing and connects to a power supply. In another embodiment, the power cord has a power bank on a first end of the cord rather than a power connector. The power bank is stored inside the housing.

18 Claims, 6 Drawing Sheets

(56) References Cited

U.S. PATENT DOCUMENTS

| | | | |
|---|---|---|---|
| 2012/0115349 A1* | 5/2012 | Kierstead | H01R 13/639 439/369 |
| 2015/0296644 A1* | 10/2015 | Chin | B65H 75/362 224/600 |
| 2020/0315309 A1* | 10/2020 | Chang | A45D 8/34 |
| 2021/0015233 A1* | 1/2021 | Durham | A45D 8/34 |

* cited by examiner

WEARABLE POWER CORD

CROSS-REFERENCE TO RELATED APPLICATIONS

This application claims the benefit of, and claims priority to, U.S. Provisional Application No. 62/948,030, filed on Dec. 13, 2019 entitled "Wearable Power Cord." That application is hereby incorporated by reference in its entirety for all purposes.

BACKGROUND

Field of the Art

This disclosure relates to fashion accessory devices that have a functional use. Specifically, the present disclosure is for a fashion accessory that may be used to charge electronic computing devices.

Discussion of the State of the Art

Mobile electronic computing devices, such as laptops, cell phones, tablets, digital cameras, etc. have proliferated in the last decade. These devices are typically very portable and, as such, these devices tend to be carried by users in a variety of different on-the-go situations. For example, users carry their mobile electronic computing devices to restaurants, bars, hikes, coffee shops etc. Mobile electronic computing devices typically are comprised of batteries that discharge to power these devices without requiring a wired or wireless connection to a power source (as long as the battery is temporarily charged with electronic power).

A limitation of present battery technology is that batteries must be charged from another power source via a connection means to connect the power source to the mobile electronic devices. As such, users typically charge their devices when they are near a secondary power source (such as an external battery, another computing device, or a wall outlet, etc.), and a connection means to connect their mobile electronic devices to the power source (such as a power cord or a wireless charging pad, etc.). However, the batteries in these mobile electronic devices sometimes discharge fully when users do not have access to a power source and/or a connection means. Without access to either one of these, users are unable to use their electronic devices often when they need these devices the most—on-the-go. In today's reality, being unable to use a mobile electronic computing device means that users are potentially without access to safety services such as being able to call or communicate with police or emergency management systems, without the ability to request transportation means, without the ability to navigate to a safe space such as their homes, etc. As such, the need for having ready access to a power source and a connection means has become more important than ever.

The electronics industry has tried to alleviate this problem by flooding the consumer marketplace with external power accessories such as portable battery packs, power cords, and protective cases with integrated batteries. However, users often forget to carry these devices with them when they need them the most (i.e. when they are on-the-go). In other instances, users forego carrying these external power accessories because they do not have any place or any means to stow them because these accessories take up too much room and/or weigh too much.

SUMMARY

The inventor has conceived and reduced to practice an apparatus that is generally always available. For example, in one embodiment, the inventive apparatus enables a user to wear a power cord around a portion of the users' body and/or their clothing, thereby making it easy for a user to carry the inventive apparatus with him or her regardless of whether the user has access to storage and/or stowing facilities such as bags, pockets, etc. In one instance, the inventive apparatus may be attached to the user's hair, waist, wrists, etc.

Another feature of the present invention is that the inventive apparatus has a secondary functional use, which also improves the odds that a user will have access to the inventive apparatus when he or she is on-the-go. For example, the present invention may help a user keep his or her hair in place such that it does not get in the way and/or get in the users' eyes. In other instances, the present invention may be used as a belt to prevent the users' clothing from moving and/or falling.

Another feature of the present invention is that it may be used as a fashion accessory, which also reduces the odds that the apparatus won't be available when the user needs it. In one instance, the apparatus may be used a fashionable bracelet, necklace, belt, hair tie, etc.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
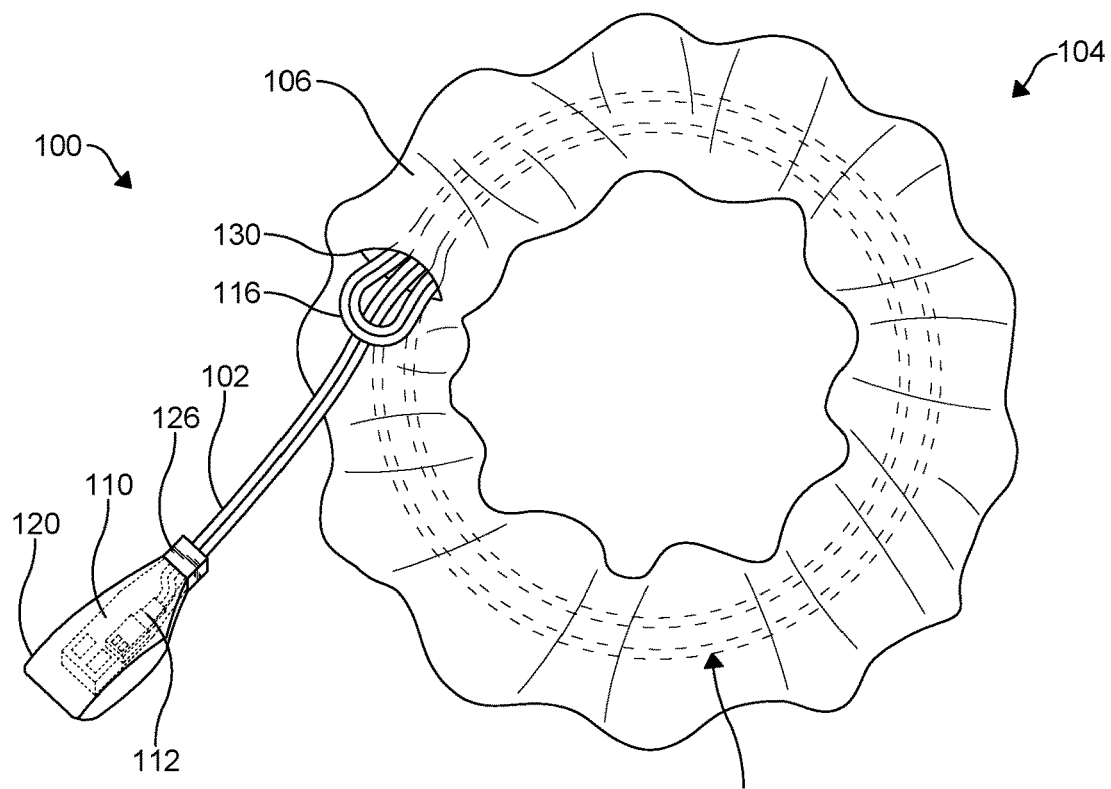
FIG. 1 is a plan view of a wearable power cord apparatus, in accordance with an embodiment of the invention.

The inventor has conceived and reduced to practice an apparatus for wearing a power source and/or a connection means (such as a power cord. Universal Serial Bus (USB) cord, etc.). In one embodiment of the invention, the inventive apparatus may be comprised of an external casing, a cavity that may be disposed within the external casing, a retraction mechanism, one or more openings, and a connection means (such as a power cord, USB cord, etc.). The various components allow the user to wear a power cord, thereby improving the likelihood that the apparatus will be available to the user when he or she needs it on-the-go. The term power cord is used generally herein, and may refer to any cord or connection means that may be used to transfer electricity and/or data from one source to another.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

In one embodiment of the invention, the apparatus described herein may conceal a connection means (such as a power cord) within an interior chamber such that the apparatus may be used as a fashion accessory without reducing its aesthetic appeal. In one instance, a user may use the apparatus by extending one end of the connection means out from the interior chamber and through an opening such that the connection means can be connected to a power source. Similarly, a second end of the connection means may be extended from the interior chamber through an opening to connect it (the connection means) to a mobile electronic computing device that needs power, data, or any other information that may be supplied by the connection means.

In another embodiment, the invention may comprise an adapter that has two ends, wherein each end is comprised of a connection means. The adapter and/or each connection means may connect to a loop element that may or may not have an interior chamber. In this embodiment, an interior chamber may not be required because of the absence of the power cord. In other embodiments, the adapter may connect to a variety of other compatible items and/or accessories such as bracelets, necklaces, hair ties, etc. In this instance, a user may use the apparatus by simply removing the loop element and connecting each connection means to a power source and/or an electronic mobile computing device.

In one embodiment, the inventive apparatus is comprised of an external casing. The external casing may conceal the connection means when the connection means is connected to the external casing. For instance, the external casing may partially or fully conceal the connection means when the connection means is hooked/inserted/placed/attached to one or more portions of the external casing. More specifically, the external casing may conceal a power cord when the power cord is placed within an interior chamber that may be comprised within the external casing.

In one embodiment, the external casing may be comprised of materials that support a variety of different fashion accessories. For example, if the apparatus is designed to be a hair tie, then the external casing may be comprised of soft, stretchy material that may expand and contract by application of force and/or removal of force. In another embodiment, if the apparatus is designed to be a belt, the external casing may be comprised of tougher material that may resist flexion and/or expansion. As described herein the material that may be used is variable and may depend on the particular application that the apparatus is intended for as would be readily apparent to a person of ordinary skill in the art, including, for example, material that is waterproof, weather resistant, etc.

The shape of the external casing may be variable, and may be varied based on specific use cases. In some instances, the external casing may be ring shaped or toroidal, such as, when the apparatus is intended to be a hair tie or a belt. In other instances, the external casing may be square or rectangular when the apparatus is intended to be, for example, a bracelet, etc. In other instances, the external casing may not have any particular shape and the shape of the apparatus may be determined by how the user uses the apparatus and/or how gravity and other forces interact with the apparatus.

In one embodiment, the external casing may be comprised of an interior chamber, which is hereinafter also referred to as a cavity. The cavity may be disposed within the external casing to conceal the connection means. In one instance the cavity may extend all or a portion of the external casing to conceal the entire length of the power cord when the power cord is placed within the apparatus. In other instances, the cavity may be disposed along the side of the external casing, wherein overhangs and other concealment techniques may partially conceal the connection means/power cord when the connection means is attached to the apparatus.

In one exemplary embodiment, the apparatus may be further comprised of a retraction mechanism that permits the connection means (power cord) to extend away from the apparatus and/or retract into the interior chamber such that it (the power cord) may be concealed when not in use. The retraction mechanism may permit the power cord to extend and/or retract or contract by using a variety of different techniques, which will be familiar to a person of ordinary skill in the art, including, without limitation, spool, coil, crumple, retract, etc. The extension/retraction action permits a user to switch from using the apparatus as a power cord, to using the apparatus for a secondary purpose (such as, for example, as a hair tie, as a fashion accessory, etc.).

The inventive apparatus may also be comprised of a connection means (herein also referred to as a cord and/or power cord. USB cord, etc.). The connection means may be comprised of one or more connection ports (such as a lightning port, USB C port, micro USB port, USB port, etc.), and a cord that connects the two ports. In one embodiment of the invention, the cord may be placed within the cavity of the external casing of the inventive apparatus. This feature of the invention permits the cord to be hidden or concealed within the apparatus when it is not in use. A variety of different cords may be used without departing from the scope of the invention, including, without limitation, power cords, charging cords, connector cords, adaptor cords, splitters, length extenders, cords with wireless contact pins, etc. In one embodiment, the casing around the connection ports may be designed to blend-in with the external casing such that the connection ports appear integrated into the apparatus and do not appear immediately visible until the ports (and the cord) are pulled out of the apparatus.

The cord may integrate or work in concert with the retraction mechanism such that the cord may extend out of or away from the apparatus and/or retract back into the apparatus with the assistance of the retraction mechanism as described herein. In an instance where a spooling retraction mechanism is used, the cord may wrap around a spool when it is retracting and may unspool when the cord is extended out. Other actions may be used, as would be apparent to a person of ordinary skill in the art, depending on the type of retraction mechanism that is used. In one embodiment of the invention, the cord may be flexible and extendible to enable the cord to stretch when sufficient pressure is applied.

In one embodiment of the invention, the apparatus may be further comprised of one or more openings to allow for the user to access the connection ports and/or the cord that may be placed within the cavity. In an exemplary embodiment of the inventive apparatus, the external casing may include as many opening as the number of connection ports that are made available to the user. For example, if the apparatus is comprised of two connection ports (wherein one connects to a power source and the other connects to the user's electronic mobile computing device) then two openings may be provided, one for each end of the cord to exit. If however, the apparatus is comprised of one connection port (wherein one port connects to the user's electronic mobile computing device, and the other end is wired to a battery pack, which is described in greater detail below) then a single opening may be provided. A user may push and/or pull the one or more ends of the cord through the openings to use the cord, and when the user wants to use the apparatus for its secondary use (as a hair tie, for example), the cord retracts back through the openings into the cavity and/or may be pushed and/or pulled back into the openings and into the cavity.

In addition to the elements described above, the inventive apparatus may have a mechanism to charge the cord. A variety of charging mechanisms may be used, without departing from the scope of the invention as would be readily apparent to a person of ordinary skill in the art, including, for example, battery power, solar power, kinetic energy, wall charging, device-to-device charging, magnetic energy, heat transfer, static energy, energy created by function, etc. A variety of energy transfer mechanisms may be used without departing from the scope of the invention, as would be readily apparent to a person of ordinary skill in the art, including, for example, via a physical connection, via wireless charging, etc. In one embodiment, the power source may be further comprised of another device that holds, transfers, absorbs, power or data, including any independently developed future technologies, including devices that use a wireless transfer protocol for using one battery to charge another battery.

In addition to charging the power cord, the inventive apparatus may have an energy storage mechanism. The energy storage mechanism may be a power bank or battery, or may be any storage mechanism that would be apparent to one skilled in the art.

In one embodiment, the apparatus may be comprised of an adapter (that does not have a cord comprised within it but may nonetheless perform the functions provided herein). For example, the adapter may be comprised of an adapter that has two ends, wherein each end is comprised of a connection means. The adapter and/or each connection means may connect to a loop element that may or may not have an interior chamber. In this embodiment, an interior chamber may not be required because of the absence of the power cord. In other embodiments, the adapter may connect to a variety of other compatible items and/or accessories such as bracelets, necklaces, hair ties, etc. In this instance, a user may use the apparatus by simply removing the loop element and connecting each connection means to a power source and/or an electronic mobile computing device.

The inventive apparatus may include an ornamental design or may be integrated into existing items. For clarity and example purposes, the inventive apparatus may be integrated into or include an ornamental design of, and not limited by, any of the following: a hair tie, wristband, headband, pet collar, bow, hair clip, button, jewelry, shoe accessories, shoes, sport band, bags, hats, ties, pedometers, watches, belts, belt buckles, pendants, keychains, scrunchies, ear muffs, glasses, clothing, any pockets, or any other design that may be apparent to one skilled in the art.

In addition to the above elements, the inventive apparatus may also include the capacity to hold and transfer data through the cord, wirelessly, or in any other way that would be apparent to one skilled in the art. The data may include, but is not limited to, GPS data, photos or files.

As described herein, the present invention may be embodied in any connection mechanism that would enable a user to make a prior art cord, adapter, etc. wearable in accordance with the elements described herein.

Although specific components are described herein, it is important to note that they are exemplary in nature and may vary as would be appreciated by someone skilled in the art.

Figure 2:
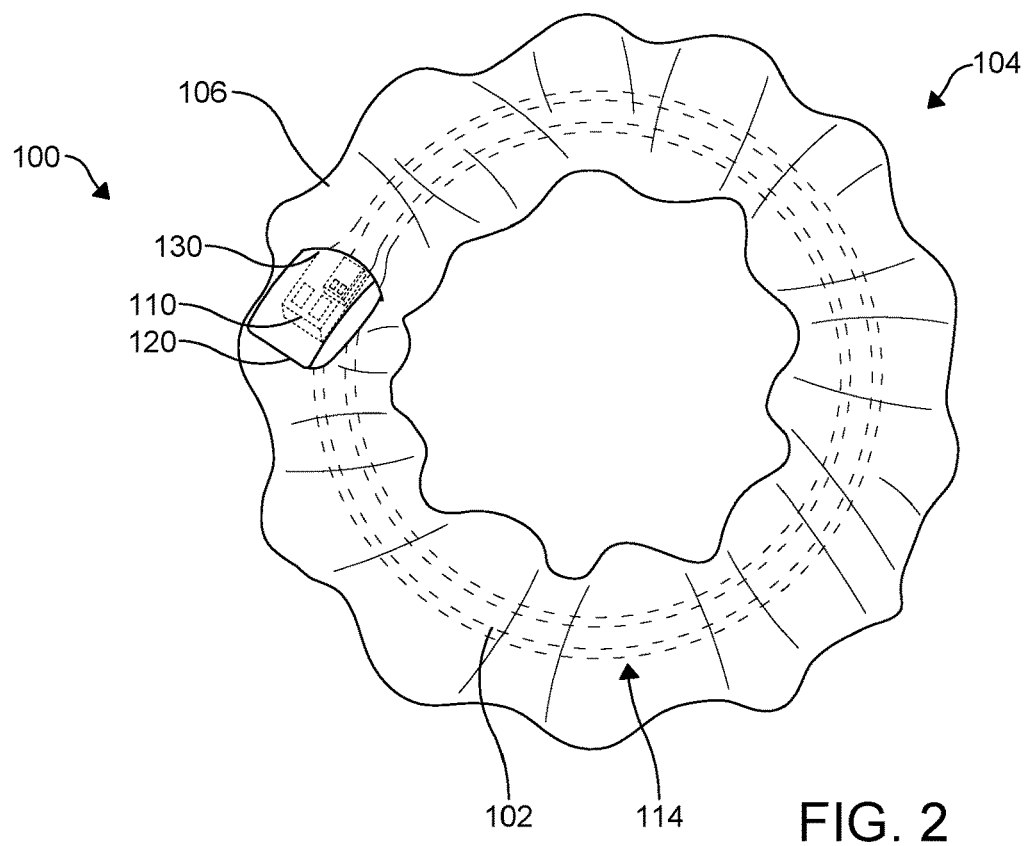
FIG. 2 is a plan view of the apparatus from FIG. 1 in a wearing configuration, in accordance with an embodiment of the invention.
Figure 3:
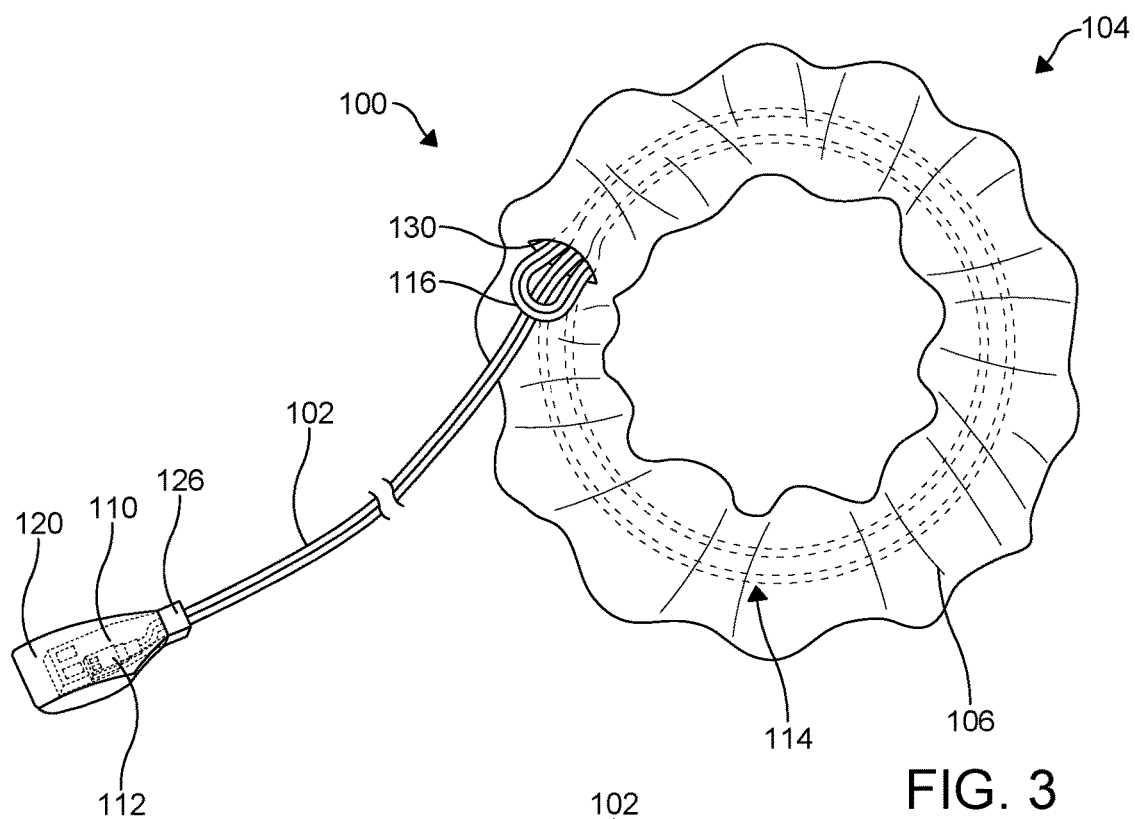
FIG. 3 is a plan view of the apparatus from FIGS. 1 and 2 in a charging configuration, in accordance with an embodiment of the invention.

FIGS. 1, 2, and 3 illustrate an exemplary embodiment of the inventive apparatus 100. More specifically. FIGS. 1, 2, and 3 illustrate an exemplary embodiment of the inventive apparatus 100, wherein the inventive apparatus 100 is a hair tie 104 (also known as a "scrunchie"). As illustrated in FIGS. 1, 2, and 3, the inventive apparatus 100 and/or the hair tie 104 may be comprised of a power cord 102 that is concealed inside fabric 106 of a fabric-covered elastic hair tie 104.

The power cord 102 may be comprised of a conventional power cord for charging a mobile electronic device, and may include an elongate cord having connectors 110, 112 on each end of the cord. In FIGS. 1, 2, and 3, the connectors 110, and 112 are illustrated in phantom in a stacked configuration positioned inside a cover or housing 120.

The connector 110 on a first end of the power cord 102 is configured for connecting to a power source. For example, the power source connector 110 may be a USB, USB-C, or the like, including power source connectors that may be developed or sold in the future.

The connector 112 on a second end of the power cord 102 is configured for connecting to a mobile electronic device, such as a cell phone, tablet, watch, etc. As such, the device connector 112 may be a lightning connector, USB. USB-C, micro USB, or the like, including device connectors that have not yet been developed, but may be available in the future.

In one alternative embodiment (not shown), rather than having a power source connector 110, the power cord 102 includes a portable power source on the first end of the elongate cord. The power source is a portable power bank, such as a rechargeable battery, a solar power bank, a kinetic power bank, or the like, including power banks that have not yet been developed but may be available in the future. In this embodiment, the power source on the first end of the elongate cord 102 remains inside the scrunchie 104 and only the device connector 112 is pulled out of the scrunchie 104 to be connected to a mobile device, which can then be charged using the portable power source.

When a user is wearing the scrunchie 104, the power cord 102 is substantially, if not completely, concealed inside the fabric 106. The wearing configuration is shown in FIG. 2. The fabric cover 106 of the scrunchie 104 includes a slit or opening 130 through which the connectors 110, 112 can be pulled out of the fabric covering 106 to be used during device charging. Thus, the connectors 110, 112 appear integrated into the scrunchie 104 and are substantially not visible until they are pulled out of the scrunchie 104 through the opening 130.

When the scrunchie 104 is in the charging configuration, as shown in FIG. 3, the power cord 102 extends out of the scrunchie 104 and the connectors 110, 112 on the ends of the power cord 102 can be removed from the housing 120 and connected, respectively, to a power supply and to a mobile electronic device. It would be readily understood by one of ordinary skill in the art that any effective mechanisms for storing the power cord 102, extending the power cord 102, and retracting the power cord 102 back into the fabric covering 106 may be used without departing from the scope of the present invention. The mechanisms described below are merely exemplary in nature and it should be readily apparent that other mechanisms fall within the scope of the present invention.

In addition to the fabric cover 106 and the power cord 102, the scrunchie 104 includes an elastic component that stretches and returns to its normal shape when unstretched. In the embodiment shown in FIGS. 1-3, the elastic component is an elastic ring 114, the entirety of which is positioned inside the fabric cover 106. The elastic ring 114 is shown in phantom inside the fabric cover 106. The fabric cover 106 is essentially an elongated tube of material formed into a ring. The circumference of the fabric cover 106 is much larger than the circumference of the elastic ring 114, which causes the fabric 106 to "scrunch" along the elastic ring 114 disposed inside the fabric covering 106. The elastic ring 114 expands and contracts and is configured to secure the scrunchie 104 to the hair of the user. In other words, the elastic ring 114 can be stretched out in order to wrap around the user's hair and then is released to contract around the user's hair in a substantially fixed position.

Figure 4A:
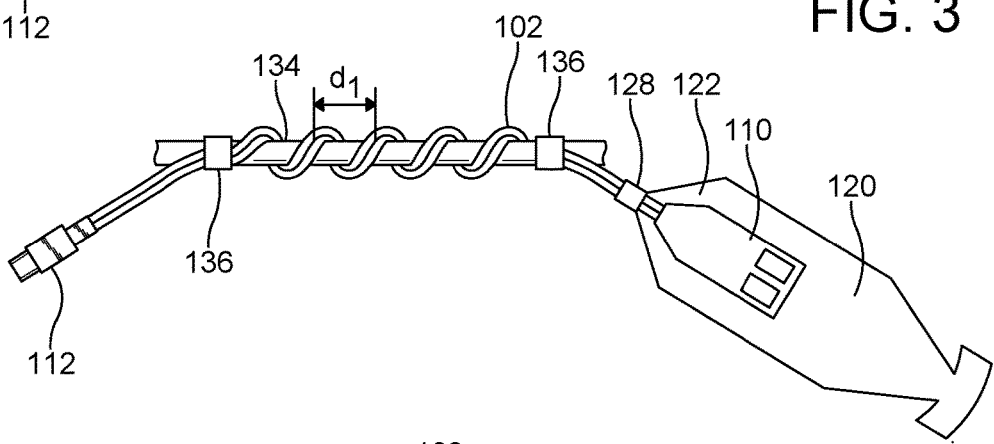
FIG. 4A is an unstretched configuration of a power cord and elastic component for use in a wearable power cord apparatus, in accordance with an embodiment of the invention.
Figure 4B:
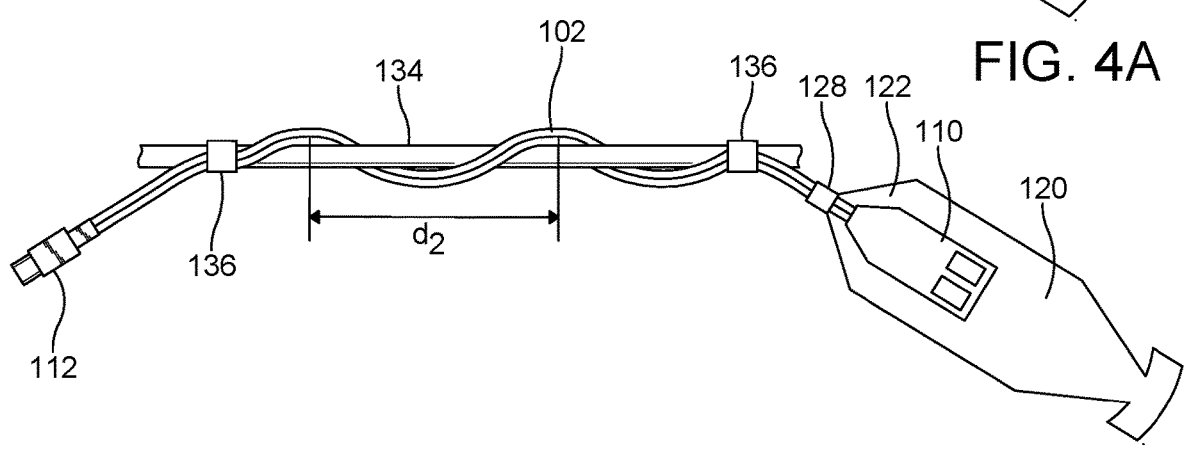
FIG. 4B is a stretched configuration of a power cord and elastic component for use in a wearable power cord apparatus, in accordance with an embodiment of the invention.

In another embodiment, depicted in FIGS. 4A and 4B, rather than the elastic component being a ring, the elastic component is an elongated elastic strip 134 and the power cord 102 is secured to the elastic strip 134. As shown in FIG. 4A, the power cord 102 is helically wrapped around the elastic strip 134. The power cord 102 is secured to the elastic strip 134 near the first and second ends of the power cord 102. Securing mechanisms 136, such as clamps, crimps, staples, adhesive, or the like, are used to secure the power cord 102 to the elongated elastic strip 134. When the elastic strip 134 is stretched, as shown in FIG. 4B, the power cord 102 also elongates due to the helical wrapping of the power cord 102 around the elastic strip 134. The distance between the turns in the coil windings of the power cord 102 increases when the elastic strip 134 is stretched. In the compressed, or unstretched configuration, shown in FIG. 4A, the distance between the turns in the coil of the power cord 102 is $d_1$, as illustrated in FIG. 4A, and the distance between the turns in the coil of the power cord 102 in the stretched configuration is $d_2$, as depicted in FIG. 4B. The stretched distance between the coils, $d_2$, is greater than the compressed distance between the coils, $d_1$.

In yet another embodiment (not shown), the power cord 102 itself has a spiral, or coiled, configuration, similar to a coiled telephone cord for a landline telephone. The spiraled power cord is configured to stretch when pulled and to resume its normal shape when no pressure or pulling is applied. Similar to the embodiment illustrated in FIGS. 4A and 4B, the distance between the windings in the coil is increased in the stretched configuration and decreased in the unstretched configuration. In this embodiment, the elasticity provided by the coiled configuration of the power cord serves as the elastic component, and as such, the coiled power cord is also the elastic component of the scrunchie 104. In one embodiment, the stretched distance between the coils may be reduced by pushing the power cord 102 in a direction that would cause the spiral to collapse.

Referring back to FIGS. 1-3, the power cord 102 is folded so that the connectors 110, 112 are adjacent to each other, creating a loop 116 that is comprised of the power cord 102. In one embodiment, the power cord 102 may be folded in half so that the connectors 110, 112 are adjacent to each other, creating a loop 116 at the other end (i.e., the middle) of the power cord 102. The folded power cord 102 is disposed inside the fabric cover 106 with the connectors 110, 112 extending through the loop 116. In this manner, when the connectors 110, 112 are pulled out of the fabric cover 106, the circumference of the portion of the power cord 102 that remains inside the fabric cover 106 is reduced, as shown in FIG. 3.

The cord 102 and connectors 110, 112 can be retracted back into the fabric covering 106 by pulling the scrunchie 104 radially outwards back to the enlarged diameter shown in FIG. 2. Alternatively, as would be readily apparent to one of ordinary skill in the art, a retraction mechanism can be used to retract the cord 102 back into the fabric covering 106. For example, the retraction mechanism may be disposed inside the fabric covering 106 and may be automatic or actuated by the user. Such a retraction mechanism may include a spool, spring, coil, crumple, or the like.

The connectors 110, 112 are disposed within the housing 120 to conceal the connectors 110, 112 when the apparatus 100 is in the wearing configuration shown in FIG. 2. That is, when the apparatus 100 is being worn by a user (e.g., in the user's hair, around the user's wrist, etc.), the connectors 110, 112 are concealed and held in place inside the housing 120. One of ordinary skill in the art would readily understand that the housing 120 may be any configuration that conceals the connectors 110, 112 and allows a user to access the connectors 110, 112 when needed.

In the embodiment illustrated in FIGS. 1-3, the housing 120 is a flexible loop of material that wraps around the connectors 110, 112. The housing 120 is similar to a fabric loop tag that is often found in an article of clothing. The housing 120 is in the closed configuration in FIGS. 1-3. FIGS. 4A and 4B show the housing 120 in an open configuration. The housing 120 is in the closed configuration when the scrunchie 104 is being worn by the user. The housing 120 is in the open configuration when the scrunchie 104 is in the charging configuration. With the housing 120 in the open configuration, a user is able to access the connectors 110, 112 in order to plug the connectors 110, 112 into a power supply and a portable device, respectively.

Figure 5:
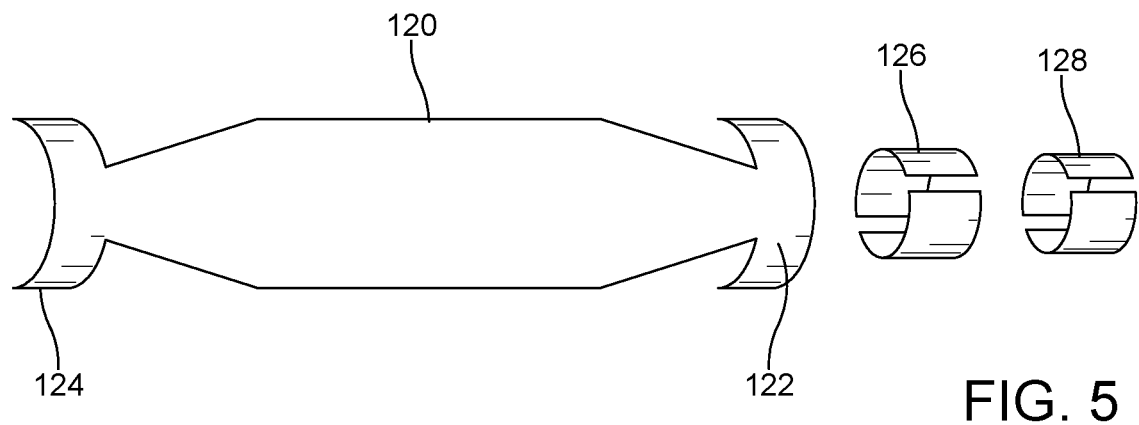
FIG. 5 is an exploded view of a housing for concealing power cord connectors in a wearable power cord apparatus, in accordance with an embodiment of the invention.

The housing 120 includes a first end 122 and a second end 124, depicted in FIGS. 4A and 4B. The housing 120 is closed by coupling the first end 122 and the second end 124 together. The housing 120 is opened by disengaging the second end 124 from the first end 122. In the open configuration, the housing 120 is a flat, substantially rectangular piece of material. In the closed configuration, the housing 120 forms a loop. The first end 122 of the housing 120 may be removably coupled to the second end 124 of the housing by any effective coupling means, such as hook and loop fasteners, a snap, a button, a hook and eye closure, a magnetic closure, a clasp, a snap hook, or the like. In the embodiments shown in FIGS. 1-4B, the first end 122 of the housing 120 is coupled to the second end 124 of the housing 120 with a retainer sleeve 126. The first end 122 of the housing 120 is coupled to the power cord 102 at a location adjacent to one of the connectors 110, 112. In the example shown in FIGS. 4A and 4B, the first end 122 of the housing 120 is coupled to the power cord 102 in a location that is adjacent to the power supply connector 110. However, it will be readily appreciated that the first end 122 of the housing 120 could alternatively be coupled to the power cord 102 at a location adjacent to the device connector 112. The first end 122 of the housing 120 is preferably fixedly connected to the power cord 102 using, for example, a retainer sleeve 128 as shown in FIGS. 4A, 4B, and 5. Alternatively, the first end 122 of the housing 120 may be coupled to the power cord 102 using any other effective coupling means, such as a crimp, clamp, clasp, adhesive, staple, or the like. In the embodiments shown in FIGS. 1-5, the housing 120 is closed by removably coupling the second end 124 of the housing to the first end 122 of the housing 120 using a retainer sleeve 126. In particular, the second end 124 of the housing 120 may be tucked into the retainer sleeve 126, or the retainer sleeve 126 may be applied after the second end 124 is brought into contact with the first end 122 of the housing 120.

The housing 120 extends out of the slit or opening 130 in the fabric cover 106. When the scrunchie 104 is in the wearable configuration, the housing 120 is preferably retained in a position that is easily accessible to the user and is also inconspicuous so that the housing 120 is easily hidden when the user is wearing the scrunchie 104, the opening 130 may be only slightly larger than the housing 120 so that the housing 120 may be disposed in the opening by friction fit, as shown in FIG. 2. The scrunchie 104 may include a retaining mechanism (not shown) for retaining the housing 120 in a position that is partially inside the fabric cover 106 and partially protruding out of the opening 130 in the fabric cover 106. Such a position is depicted in FIG. 2. The retaining mechanism may be a snap, hook and loop closure, hook and eye closure, button, clasp, snap hook, or any similar mechanism that allows the housing 120 to be removably coupled to the fabric cover 106 during the wearing configuration. Alternatively, the opening 130 may be smaller than the housing 120 to prevent the housing 120 from being pulled into the fabric covering 106 through the opening 130.

In another embodiment, shown in FIGS. 6-9, a wearable apparatus 20 is a stretchable hair band or hair tie 204 that includes a power cord 202 concealed within the hair tie 204. In particular, the power cord 202 includes an elongate cord having a power supply connector 210 on one end and a device connector 212 on the other, opposite end. The connectors 210, 212 are hidden within a housing 220 when the apparatus 200 is in a wearing configuration. The connectors 210, 212 are removed or withdrawn from the housing 220 when the apparatus 220 is in a charging configuration.

In one alternative embodiment (not shown), rather than having a power supply connector 210, the power cord 202 includes a portable power source on the first end of the elongate cord. The power source is a portable power bank, such as a rechargeable battery, a solar power bank, a kinetic power bank, or the like, including power banks that have not yet been developed but may be available in the future. In this embodiment, the power source on the first end of the elongate cord remains inside the housing 220 and only the device connector 212 is removed from the housing 220 to be connected to a mobile device so that the device can be charged using the portable power source.

The hair tie 204 includes an elastic component that allows the hair tie 204 to stretch and return to its original, unstretched shape. In one embodiment, shown in FIG. 9, the elastic component is an elongate elastic string or strip 214 and the power cord 202 is helically wrapped around the elastic strip 214. The elastic strip 214 and the power cord 202 wrapped around the elastic strip 214 are covered with a stretchy fabric sheath 216. The stretchy fabric sheath 216 is different from the fabric covering 106 of the previous embodiment in that the stretchy fabric sheath 216 is in direct contact with the power cord 202 and the elastic strip 214. That is, the inner surface of the stretchy fabric sheath 216 is in direct, constant contact with the power cord 202 and the elastic strip 214. The stretchy fabric sheath 216 is more like a coating surrounding the elastic strip 214 and the power cord 202, whereas the fabric covering 106 is a tubular piece that contains the elastic component and the power cord, but has extra room therein for scrunching around the power cord and the elastic component.

In another embodiment (not shown), rather than including a separate elastic component, the power cord itself has elasticity. For example, the power cord may have a spiral, or coiled, configuration, similar to a coiled telephone cord for a landline telephone. The spiraled power cord is configured to stretch when pulled and to resume its normal shape when no pressure or pulling is applied. The distance between the windings in the coil is increased in the stretched configuration and decreased in the unstretched configuration. In this embodiment, the elasticity provided by the coiled configuration of the power cord serves as the elastic component, and as such, the coiled power cord is also the elastic component of the apparatus 200.

Figure 6:
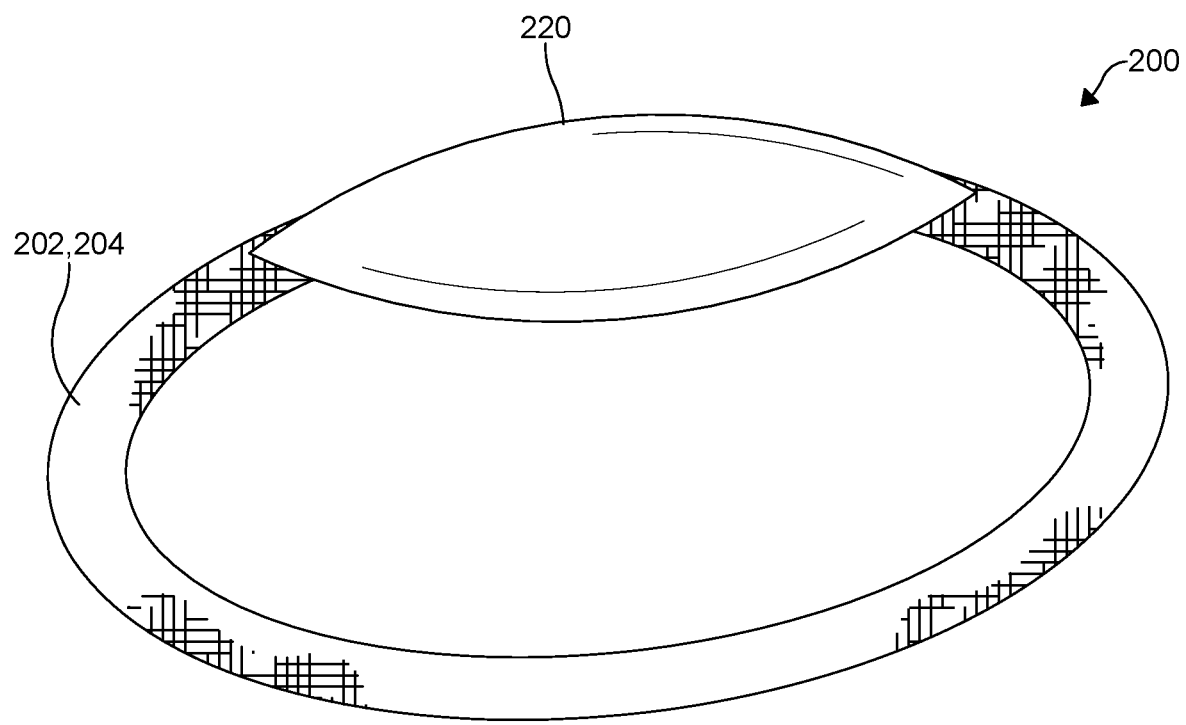
FIG. 6 is a plan view of a wearable power cord apparatus in a wearable configuration, in accordance with an embodiment of the invention.
Figure 7:
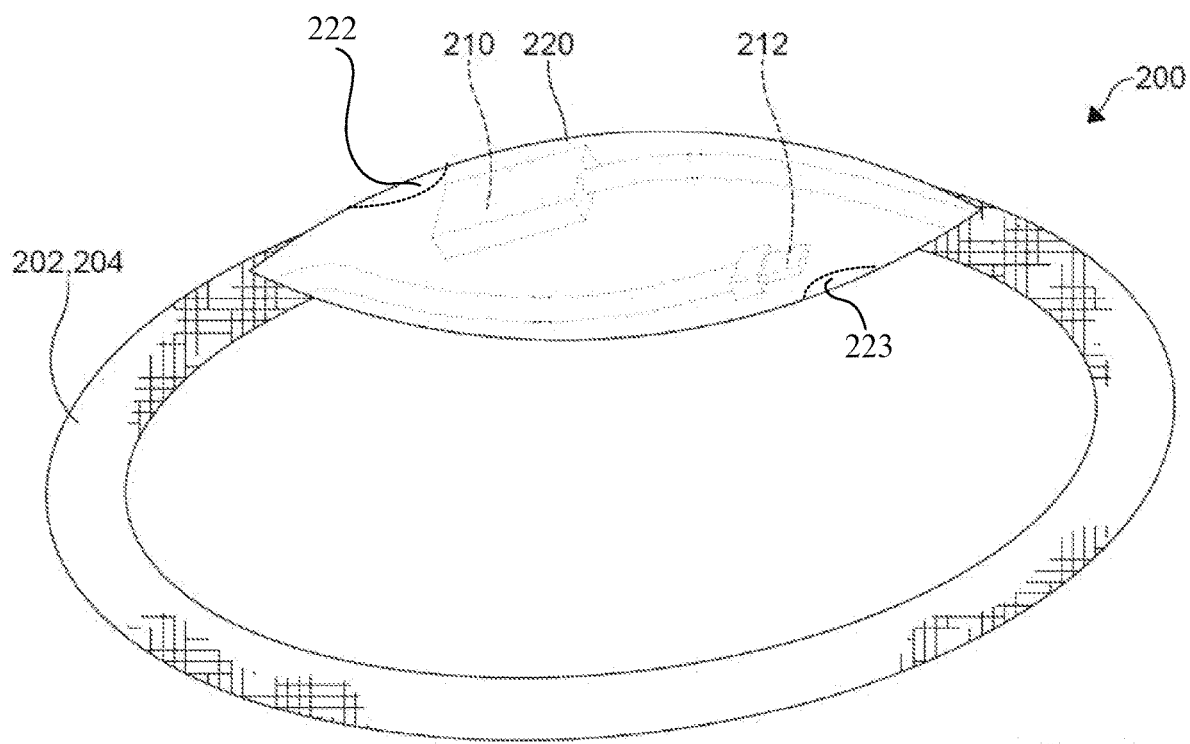
FIG. 7 is a plan view of a wearable power cord apparatus in a wearable configuration, in accordance with an embodiment of the invention.
Figure 8:
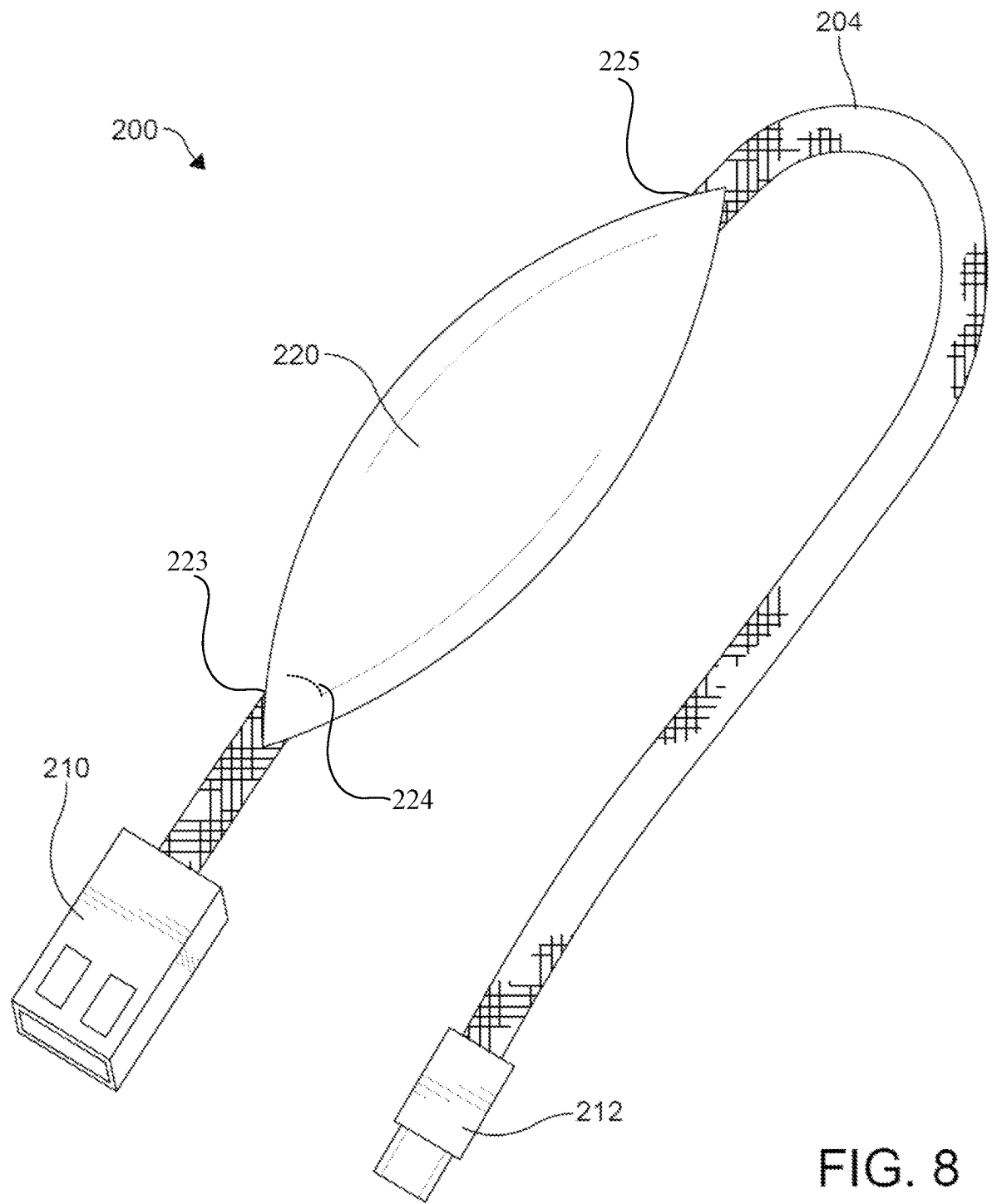
FIG. 8 is a plan view of a wearable power cord apparatus in a charging configuration, in accordance with an embodiment of the invention.
Figure 9:
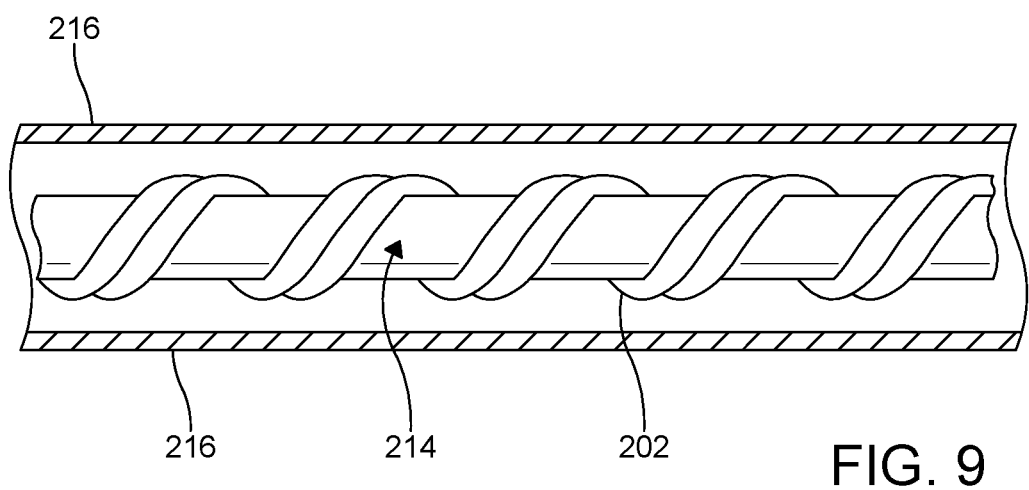
FIG. 9 is a partial cross-sectional view of a power cord and elastic component for use in a wearable power cord apparatus, in accordance with an embodiment of the invention.

As illustrated in FIGS. 6, 7, and 8, the housing 220 may be a decorative shell that includes openings and/or compartments or slots for holding the connectors 210 and/or 212 in place. In one embodiment, the housing 220 is a rigid, decorative shell. In other embodiments, the housing 220 may be semi-rigid, or a soft shell made out of appropriate material, such as fabric, wicker, plastic, rubber, etc. The housing 220 may include at least one compartment or slot for holding at least one connector in place. As illustrated if FIG. 7, the housing 220 is comprised of a compartment for housing connectors 210, 212 in place. As would be readily understood by a person of ordinary skill in the art, multiple interior compartments may be used including, for example but not limited to, one compartment for each connector 210 and 212.

As depicted in FIG. 7, the connectors 210, 212 are disposed within the housing 220 when the apparatus 200 is in the wearing configuration, the connectors 210, 212 may be removed from the housing 220 or extend through the housing 220 and exit through openings 222 and 223. The openings 222 and 223 may be disposed on one or more sides of the housing 220 when the apparatus 200 is in the charging configuration. As would be understood by a person of ordinary skill in the art, a variety of different types of openings may be used without departing from the scope of the invention. Moreover, the placement of the openings may be varied without departing from the scope of the invention. In one embodiment, the openings 222 and 223 may be on opposite sides of the housing 220, which may allow the connectors 210 and 212 to enter and/or exit from either direction of the housing.

In one embodiment, as illustrated in FIG. 7, opening 222 may permit connector 210 to exit the housing 220. Opening 223 may enable connector 212 to exit the opening. In this configuration, connector 210 and 212 may exit their respective openings 222 and 223 by being pushed out of the housing (as opposed to being pulled out the housing 220). In other embodiments, wherein the openings are disposed differently, the connectors may exit the housing by being pulled out from the openings (as opposed to being pushed out).

FIG. 8 illustrates an embodiment wherein connector 210 is pushed out of the housing 220 via an opening 223, and connector 212 is pushed into the housing 220 via the opening 224. In this configuration, the housing 220 remains attached to the hair tie 204 even when the apparatus is in a charging configuration (and as such, a user would not have to worry about losing or misplacing the housing 220 when the apparatus is in a charging configuration). In other words, as illustrated in FIG. 8, the housing 220 remains attached to the hair tie 204 even when the two connectors 210 and 212 are removed from the housing 220. As illustrated in FIG. 8, the connector 210 may slide in a distal and/or proximal direction relative to the housing 220 (including within the housing 220) because the hair tie 204 may slide-ably move through openings 223 and 225, which are disposed on opposite ends of the housing 220. The opening 223 may enable the connector 210 to enter and/or exit the housing 220 when hair tie is pushed or pulled in the appropriate direction. The opening 225, however, may only permit the wire portion of the hair tie 204 to move in distal and/or proximal direction when the hair tie is pushed or pulled in an appropriate direction. The opening 225 may also prevent the connector 210 from exiting the housing via the opening 225. For example, opening 225 may be smaller in diameter than the connector 210. In this manner, the housing 220 remains coupled to the hair tie 204 even when the apparatus is used in a charging configuration.

The connectors 210, 212 may be held in place in the housing 220 by friction fit or may be clicked into place in slots the housing 220. It should be readily understood by one of ordinary skill in the art that any housing configuration for holding and storing the connectors 210, 212 may be used without departing from the scope of the invention. For example, in configuration of the invention, the housing may be a removable hollow shell having an interior cavity that is sized and shaped to hold the connectors 210, 212 therein.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes." "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An apparatus for wearing a power cord comprising:
   an elongate power cord having a length that extends from a first end to a second end, wherein the first end comprises a power connector and the second end comprises a device connector;
   an elastic component configured to expand and contract and to secure the apparatus to a user;
   a housing configured for holding the power connector and the device connector therein; and
   a fabric covering, wherein the fabric covering comprises at least one of a tubular fabric covering, wherein the elastic component is an elastic ring that is entirely disposed within the tubular fabric covering, and a stretchy fabric sheath surrounding the power cord and the elastic component,
   wherein the apparatus has a wearing configuration and a charging configuration,
   wherein, in the wearing configuration, the device connector and the power connector are disposed in the housing and the apparatus is secured to the user,
   wherein, in the charging configuration, the device connector extends out of the housing and connects to a portable electronic device, and
   wherein, in the charging configuration, the power connector extends out of the housing and connects to a power supply.

2. The apparatus of claim 1, wherein the tubular fabric covering is sized and shaped to cover substantially all of the length of the power cord when the apparatus is in the wearing configuration.

3. The apparatus of claim 1, wherein the fabric covering comprises an opening, and at least a portion of the housing extends out of the opening.

4. The apparatus of claim 1, wherein the device connector is one of: a micro USB connector, a USB-A connector, a USB-B connector, a USB-C connector, and a lightning connector.

5. The apparatus of claim 1, wherein the power connector is one of: a micro USB connector, a USB-A connector, a USB-B connector, a USB-C connector, and a lightning connector.

6. The apparatus of claim 1, wherein the power cord is helically wrapped around the elastic component so that the power cord elongates when the elastic component is stretched.

7. The apparatus of claim 1, wherein the housing comprises a flexible loop of material configured to cover the device connector and the power connector.

8. The apparatus of claim 7, wherein the flexible loop is coupled to the power cord in a location that is adjacent to the power cord first end or the power cord second end.

9. The apparatus of claim 7, wherein the flexible loop of material comprises a first end and a second end, and wherein the flexible loop is formed by coupling the first end to the second end, thereby closing the housing when the device connector and the power connector are disposed within the housing.

10. The apparatus of claim 9, wherein the flexible loop of material is configured so that the device connector and the power connector are accessible to a user by disengaging the flexible loop first end from the flexible loop second end to open the housing.

11. The apparatus of claim 6, wherein the housing comprises a shell having a first slot configured for holding the device connector therein and a second slot configured for holding the power connector therein.

12. The apparatus of claim 11, wherein, in the wearing configuration, the device connector is disposed in the first slot and the power connector is disposed in the second slot.

13. The apparatus of claim 12, wherein, in the charging configuration, the device connector is removed from the first slot and the power connector is removed from the second slot.

14. An apparatus for wearing a power cord comprising:
    an elongate power cord having a length that extends from a first end to a second end, wherein the first end comprises a power source and the second end comprises a device connector;
    an elastic component configured to expand and contract and to secure the apparatus to a user;
    a housing configured for holding the device connector therein; and
    a fabric covering, wherein the fabric covering comprises at least one of a tubular fabric covering, wherein the elastic component is an elastic ring that is entirely disposed within the tubular fabric covering, and a stretchy fabric sheath surrounding the power cord and the elastic component,
    wherein the apparatus has a wearing configuration and a charging configuration,
    wherein, in the wearing configuration, the device connector is disposed in the housing and the apparatus is secured to the user, wherein, in the charging configuration, the device connector extends out of the housing and connects to a portable electronic device.

15. The apparatus of claim 14, wherein the fabric covering comprises the tubular fabric covering, and wherein the tubular fabric covering has an opening, wherein the elastic component and the elongate power cord are disposed inside the tubular fabric covering, and wherein the housing extends out of the opening in the tubular fabric covering.

16. The apparatus of claim 14, wherein the housing is configured to open so that a user is able to access the device connector by opening the housing.

17. The apparatus of claim 14, wherein the power source is a portable power bank.

18. The apparatus of claim 17, wherein the power bank is a rechargeable battery, a solar power bank, or a kinetic power bank.

* * * * *